United States Patent
Clem et al.

(10) Patent No.: US 8,619,802 B2
(45) Date of Patent: *Dec. 31, 2013

(54) MESSAGE RING IN A SWITCHING NETWORK

(75) Inventors: Shaun Clem, Thousand Oaks, CA (US); Jimmy Pu, Agoura Hills, CA (US); Darrin Patek, Thousand Oaks, CA (US); Todd Khacherian, Moorpark, CA (US); Chris Reed, Oxnard, CA (US)

(73) Assignee: T.R. Communications CA, L.L.C., Wilmington, DE (US)

( * ) Notice: Subject to any disclaimer, the term of this patent is extended or adjusted under 35 U.S.C. 154(b) by 218 days.

This patent is subject to a terminal disclaimer.

(21) Appl. No.: 12/831,171

(22) Filed: Jul. 6, 2010

(65) Prior Publication Data

US 2011/0026540 A1    Feb. 3, 2011

Related U.S. Application Data

(63) Continuation of application No. 11/627,034, filed on Jan. 25, 2007, now Pat. No. 7,751,419, which is a continuation of application No. 10/006,072, filed on Dec. 5, 2001, now Pat. No. 7,203,203.

(51) Int. Cl.
*H04L 12/28* (2006.01)

(52) U.S. Cl.
USPC ............ 370/424; 370/389; 370/235; 370/470

(58) Field of Classification Search
None
See application file for complete search history.

(56) References Cited

U.S. PATENT DOCUMENTS

| | | | |
|---|---|---|---|
| 4,704,606 | A | 11/1987 | Hasley |
| 4,754,451 | A | 6/1988 | Eng et al. |
| 5,404,461 | A | 4/1995 | Olnowich et al. |
| 5,550,823 | A | 8/1996 | Irie et al. |
| 5,555,543 | A | 9/1996 | Grohoski et al. |
| 5,606,370 | A | 2/1997 | Moon |
| 5,784,003 | A | 7/1998 | Dahlgren |
| 5,841,874 | A | 11/1998 | Kempke et al. |
| 5,856,977 | A | 1/1999 | Yang et al. |
| 5,859,975 | A | 1/1999 | Brewer et al. |
| 5,898,689 | A | 4/1999 | Kumar et al. |
| 5,909,440 | A | 6/1999 | Ferguson et al. |
| 6,067,408 | A | 5/2000 | Runaldue et al. |
| 6,172,927 | B1 | 1/2001 | Taylor |
| 6,389,489 | B1 | 5/2002 | Stone et al. |
| 6,442,674 | B1 | 8/2002 | Lee et al. |
| 6,460,120 | B1 | 10/2002 | Bass et al. |
| 6,487,171 | B1 | 11/2002 | Honig et al. |
| 6,493,347 | B2 | 12/2002 | Sindhu et al. |
| 6,510,138 | B1 | 1/2003 | Pannell |
| 6,570,876 | B1 | 5/2003 | Aimoto |

(Continued)

OTHER PUBLICATIONS

Cisco Systems Inc., Token Ring IEEE 802.5, Chapter 9, Internetworking Technologies Handbook, www.cisco.com/univercd/cc/td/doc/cisintwk/ito_doc/tokenrng.htm.

(Continued)

*Primary Examiner* — Michael J Moore, Jr.
(74) *Attorney, Agent, or Firm* — Perkins Coie LLP

(57) ABSTRACT

A switching network for efficiently receiving and transmitting data packets having both frames and messages includes a crossbar switch with a plurality of surrounding ports for exclusively switching frames which normally consist of large data streams of 40 to 60 bytes. Then the ports are connected together in a message ring and small data entity messages, for example 4, 8, or 12 bytes, are switched from an input port to an output port around the ring avoiding congestion of the crossbar switch.

36 Claims, 5 Drawing Sheets

(56) References Cited

U.S. PATENT DOCUMENTS

| | | |
|---|---|---|
| 6,574,194 B1 | 6/2003 | Sun et al. |
| 6,587,470 B1 | 7/2003 | Elliot et al. |
| 6,611,527 B1 | 8/2003 | Moriwaki et al. |
| 6,621,818 B1 | 9/2003 | Szczepanek et al. |
| 6,658,016 B1 | 12/2003 | Dai et al. |
| 6,728,206 B1 | 4/2004 | Carlson |
| 6,735,219 B1 | 5/2004 | Clauberg |
| 6,754,741 B2 | 6/2004 | Alexander et al. |
| 6,836,479 B1 | 12/2004 | Sakamoto et al. |
| 6,842,443 B2 | 1/2005 | Allen, Jr. et al. |
| 7,046,660 B2 | 5/2006 | Wallner et al. |
| 7,096,305 B2 | 8/2006 | Moll |
| 7,203,203 B2 | 4/2007 | Clem et al. |
| 7,751,419 B2 | 7/2010 | Clem et al. |
| 2001/0037435 A1 | 11/2001 | Van Doren |

OTHER PUBLICATIONS

Fahmy, A Survey of ATM Switching Techniques, Aug. 14, 2001, Department of Computer and Information Science, The Ohio State University.

Gupta, Scheduling in Input Queued Switches: A Survey, Jun. 1996, Department of Computer Science, Stanford University, California.

Petaswitch Solutions, Inc., Company Overview, 2001, http://wwvv.peta-switch.com/markets/overview.htm.

Petaswitch Solutions, Inc., PetaSwitch Solutions Announces Raising $4 Million in First Round Financing, Press Release, 2001, http://peta-switch.com/newsroom/press_releases.htm.

Petaswitch Solutions, Inc., The Pisces Chipset, Product Brief, 2001, http://www.peta-switch.com/products/product_brief.htm.

Schoenen, et al., Distributed Cell Scheduling Algorithms for Virtual-Output-Queued Switches, Dec. 1999, pp. 1211-1215, vol. 1, Globecom, IEEE Global Telecommunications Conference.

Stiliadis, et al., Rate-Proportional Servers: a Design Methodology for Fair Queueing Algorithms, Dec. 1995, Computer Engineering & Information Sciences, University of California, Santa Cruz.

Stoica, et al., Earliest Eligible Virtual Deadline First: A Flexible and Accurate Mechanism for Proportional Share Resource Allocation, Department of Computer Science, Old Dominion University, Norfolk, VA.

Webopedia, What Is a Token Ring Network?, Webopedia Definition and Links, http://www.webopedia.com/TERM/T/token_ring_network.html.

MESSAGE RING IN A SWITCHING NETWORK

RELATED APPLICATION INFORMATION

This patent is related to application Ser. No. 09/971,097 entitled "Switching Apparatus For High Speed Channels Using Multiple Parallel Lower Speed Channels While Maintaining Data Rates" and filed Oct. 3, 2001.

This application is a continuation of U.S. application Ser. No. 11/627,034 filed Jan. 25, 2007, now U.S. Pat. No. 7,751,419 issued Jul. 6, 2010, entitled "Message Ring in a Switching Network", which is a continuation of U.S. application Ser. No. 10/006,072, now U.S. Pat. No. 7,203,203 issued Apr. 10, 2007 entitled "Message Ring In A Switching Network" and filed Dec. 5, 2001, all of which are incorporated herein by reference in their entireties.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

1. Field of the Invention

The present application is directed to a switching network for receiving and transmitting data packets having both frames and messages which utilizes a ring for messages and an associated crossbar switch for frames.

2. Description of the Related Art

In a switching network, all receiving channels (or ports) route data to a switching fabric. The switching fabric sends the data to a specific destination port. The data is normally in the form of data packets either of uniform or variable length. A data packet may include both frames which consist of relatively long strings of data bytes for example 40 to 64 bytes and larger, and messages which consist of small entities of, for example 4, 8, or 12 bytes. Such small entity messages might include formats of broadcast flow control, back pressure/feed forward messages, linked table configuration, write or read formats and other similar formats. Input ports are connected to output ports by a well known crossbar connection matrix. Such crossbar matrices typically reside on a die where there may be 64 ports and each port has a data bus of 16 signal lines. Thus, with a total of 2,048 signal lines, the crossbar switches are silicon resource intensive. In other words, to efficiently utilize this silicon resource (that is the silicon die on which the crossbar switch is integrated), it is very inefficient to transmit small entity messages (that is 4, 8, or 12 bytes, for example, as discussed above) through the crossbar switch. It is more efficient, rather, to transmit frame size packet portions which range from 40 to 64 bytes and greater.

Ring networks have also been suggested for data transfer. See IEEE 802.5 standard. However, this is used in a computer network where a computer must first catch a token and then attach a "message" to it.

DETAILED DESCRIPTION OF THE INVENTION

Figure 1:
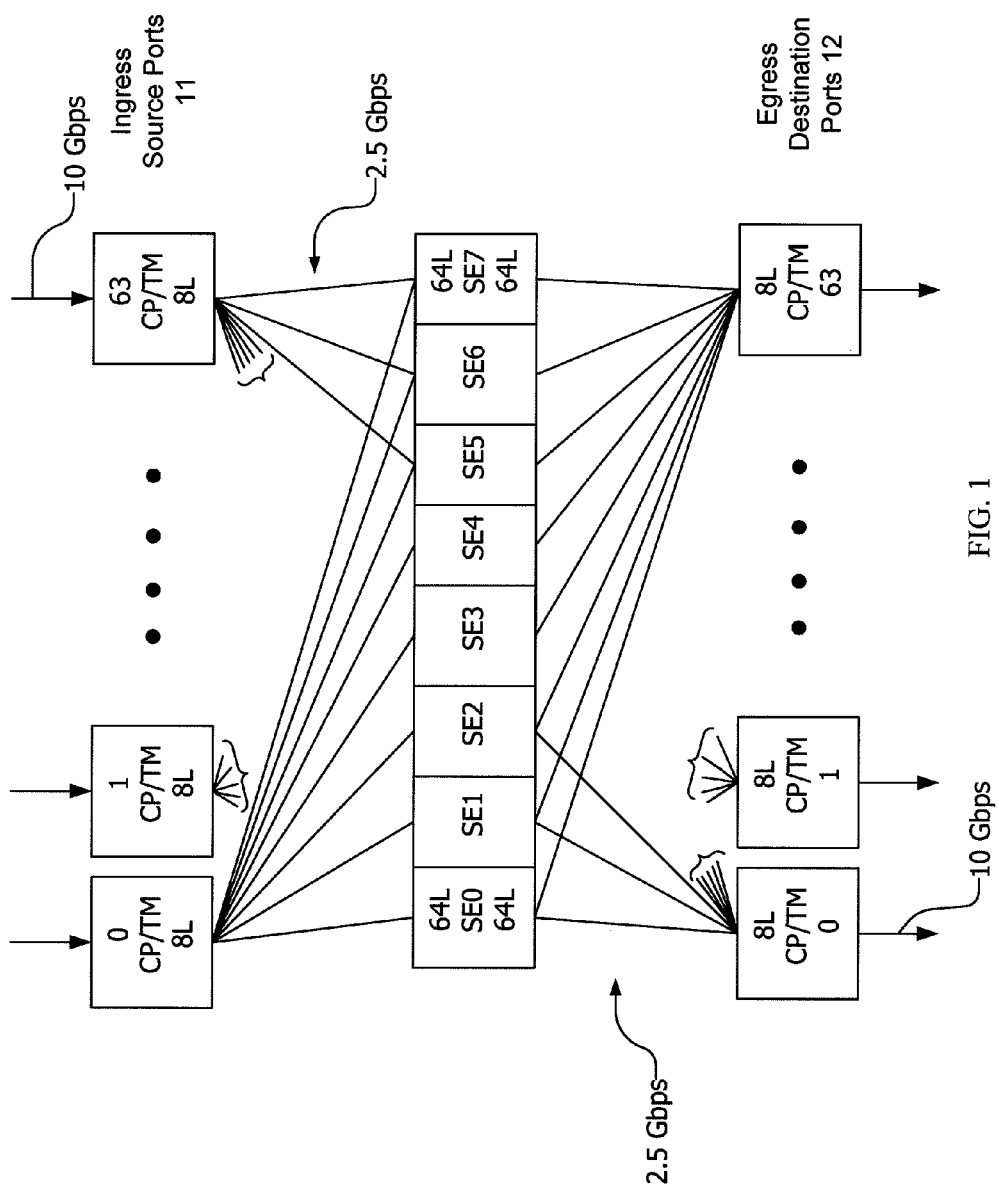
FIG. 1 is a simplified block diagram of switching apparatus embodying the present invention.

FIG. 1 is an overall diagram of a switching apparatus which include as an essential component the switching network of the present invention. Specifically, there are 8 switch elements designated SE0 through SE7. Each of these switch elements have 64 input and 64 output lines. There are equivalent numbers of switching networks in each of the switching elements. The overall switching apparatus in FIG. 1 is also disclosed in co-pending application. Ser. No. 09/971,097.

Referring in general to the operation of the switching apparatus of FIG. 1, there are a number of ingress source ports 11 numbered 0 through 63 each receiving data packets from, for example, a framer which normally puts together such packet, at a rate of 10 Gbps. The ingress ports 11 include a TM (traffic manager) and a communications processor (CP) and are labeled CP/TM. Each ingress source port has an 8-line output port, each individually coupled to an input port of switch elements SE0 through SE7 which together create a so-called switching fabric. In turn, the eight switch elements each with 64 input ports and 64 output ports are similarly connected on an output side to egress ports 12 also designated CP/TM which have 8-line inputs and are numbered 0 through 63. The combination of the 64 ingress ports and 64 egress ports make up a 64 port full duplex port.

Again, as on the input side, each output port of a switch element has a direct serial link to one of the CP/TMs or egress port units. Then the egress ports 12 are coupled into, for example, a high speed channel network (e.g., fiber optic) to transmit data at a 10 Gbps rate in a manner similar to the incoming data, but with the data having been rerouted to a selected destination port. Finally, as indicated in FIG. 1, the high input and output data rates of 10 Gbps cannot normally be sustained separately by the switch elements SE0 through SE7 which as indicated are limited to a lower data rate of 2.5 Gbps.

Figure 2:
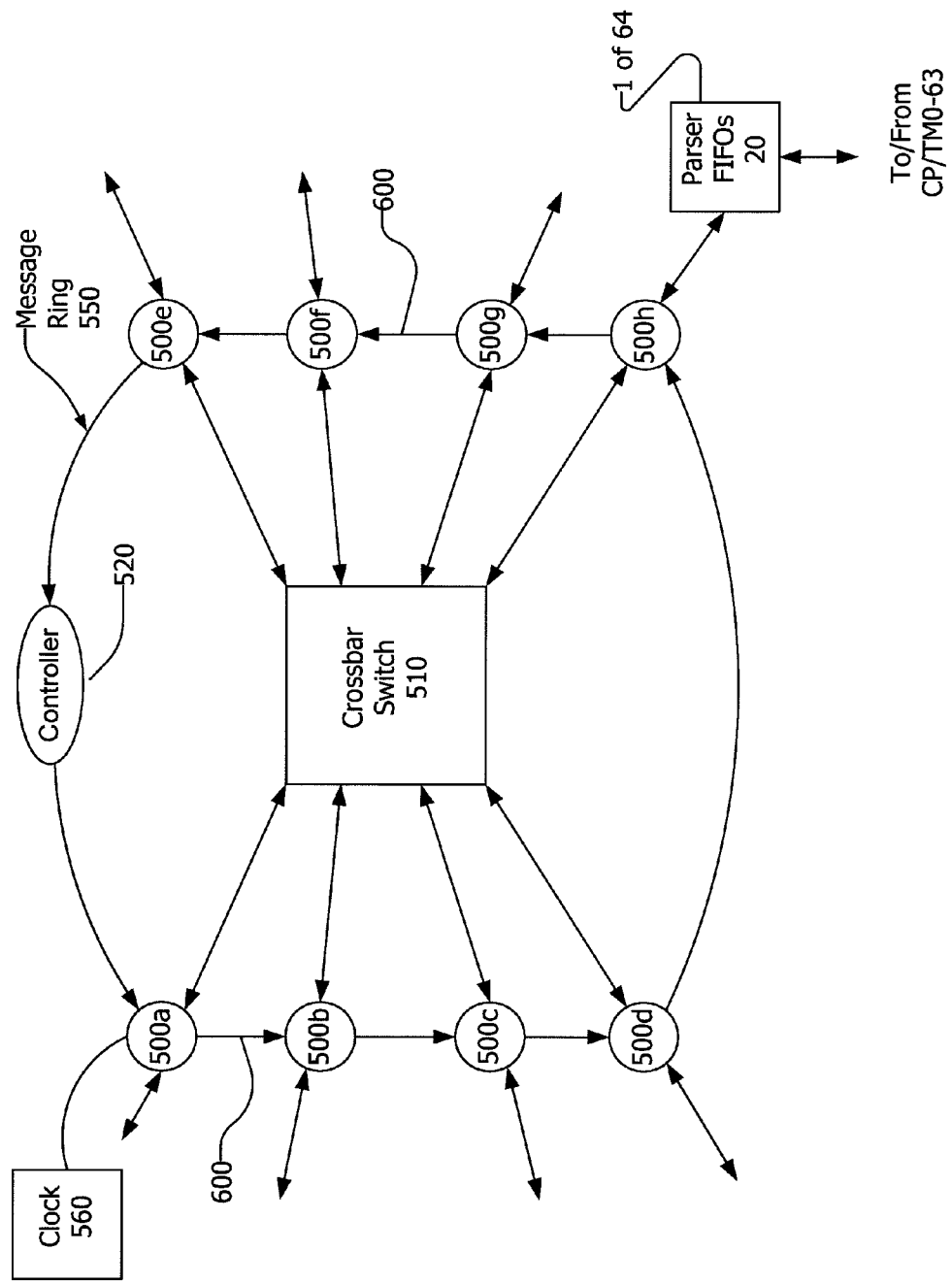
FIG. 2 is a circuit schematic of message ring architecture embodying the present invention.

FIG. 2 illustrates a combined crossbar switch 510 with a message ring 550 having a number of input ports nominally designated 500a through 500h. From a practical standpoint, in the context of the present invention, there is one input port (and one output port) for each of the 64 lines shown in, for example, switching element SE0 in FIG. 1. Thus, the circuit of FIG. 2 is an integrated portion of each of the switching elements SE0 and SE7 of FIG. 1. Each port may either be a source, that is input, or destination port depending on the nature and the location of the switching element. The switching network of FIG. 2 forms a typical crossbar switch (as discussed above) where the internal crossbar switch unit 510 receives from the various input ports 500a through 500h, data streams from the various communications processors/traffic managers 0 through 63 illustrated in FIG. 1.

Figure 3:
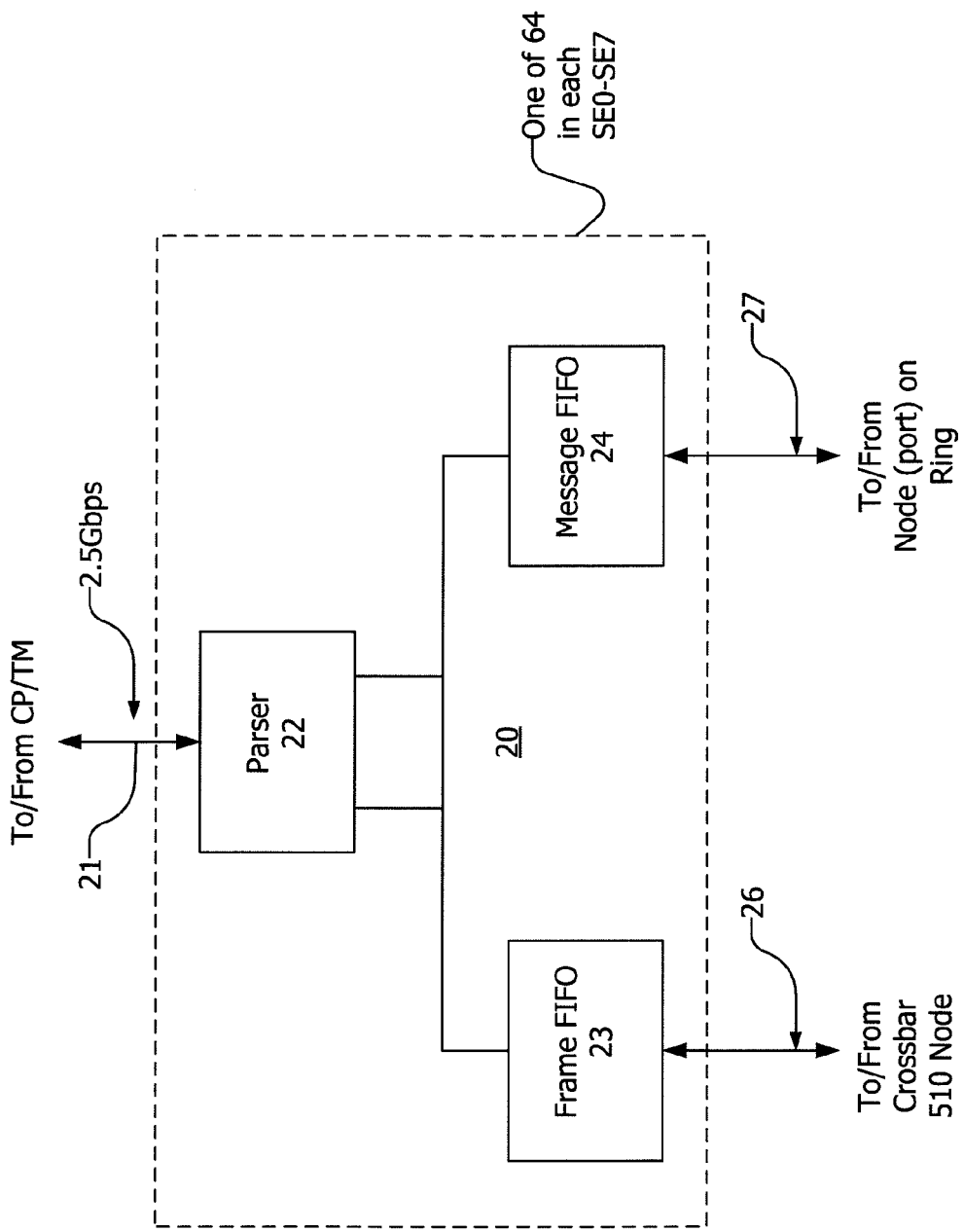
FIG. 3 is a block diagram illustrating the operation of FIG. 2.

Referring briefly to FIG. 3, each port of the switching network of FIG. 2, is associated with a parser/FIFO illustrated in dash outline 20 in FIG. 2 and shown in greater detail in FIG. 3. On line 21, data packets are routed to or from a CP/TM at a 2.5 Gbps rate. A parser 22 identifies whether the portion of the data packet is a message or frame and then respectively sends it to a frame FIFO 23 or a message FIFO 24 (FIFO being an abbreviation for First In First Out memory). Then, on the input/output lines 26, 27 of the respective FIFOs, the frame or message data is input to a port or node 500a-500h (one of the 64 ports) and processed or switched as determined by the ring controller 520 and the clock 560.

If a frame is being routed to a desired destination port, the crossbar switch 510 operates in a normal manner where, for example, data would be input into the node 500h directly switched to the crossbar switch 510 and then immediately switched to the desired destination port. As discussed above, to perform this switching with a small entity message would be both inefficient and unduly congest the crossbar switch. Thus, if a message that is in place or queued up in message FIFO 24 as illustrated in FIG. 3, it is inserted a particular node or port (assuming the port has no other data present in it at the moment) and then passed successively through intermediate ports via the interconnecting lines 600 between ports until the final destination port is reached. Thus, the interconnecting lines 600 between the ports 500a-500h form the message ring 550. Under the control of clock 560, messages are moved from one available port to the next for every clock pulse.

Figure 4:
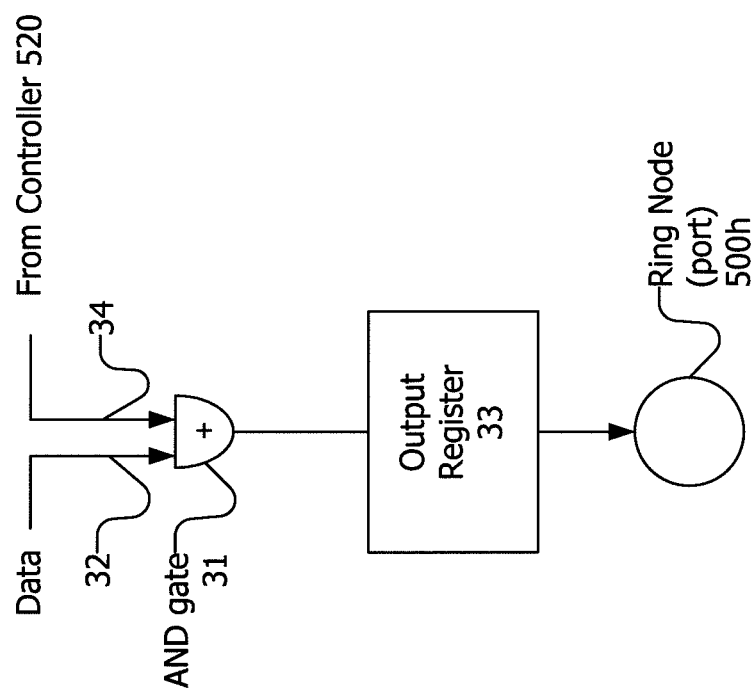
FIG. 4 is a circuit schematic illustrating the operation of FIG. 2.

In order to avoid conflict with the crossbar switch, however, each port 500a-500h includes, as illustrated in FIG. 4, a gate 31 (nominally of the AND type) which buffers a data input 32 to an output register 33 which is connected to, for example, a port 500h under the control of line 34 from the controller 520. This prevents conflict with the simultaneous crossbar switching of the same switching network as illustrated in FIG. 2.

Figure 5:
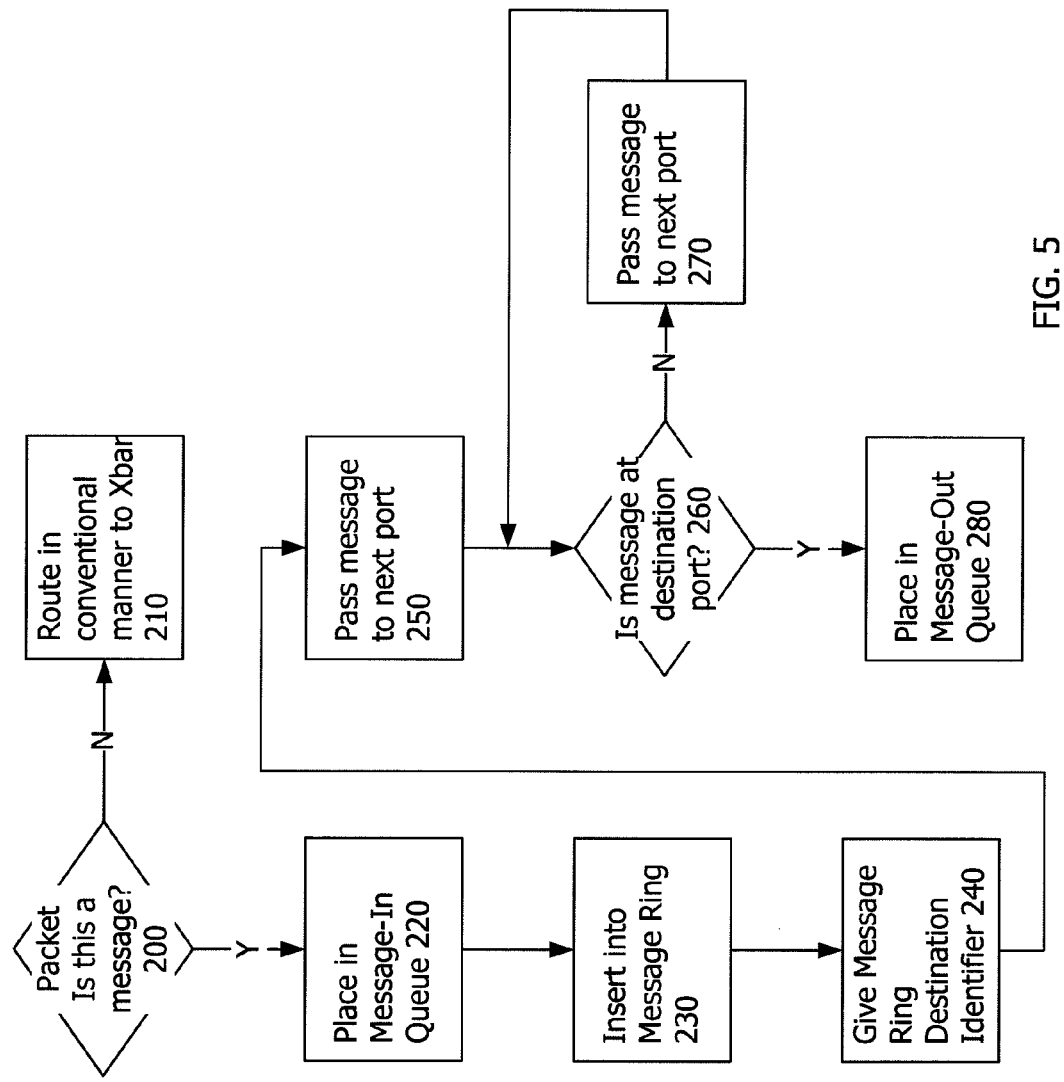
FIG. 5 is a flow chart illustrating the operation of FIG. 2.
Figure 5:
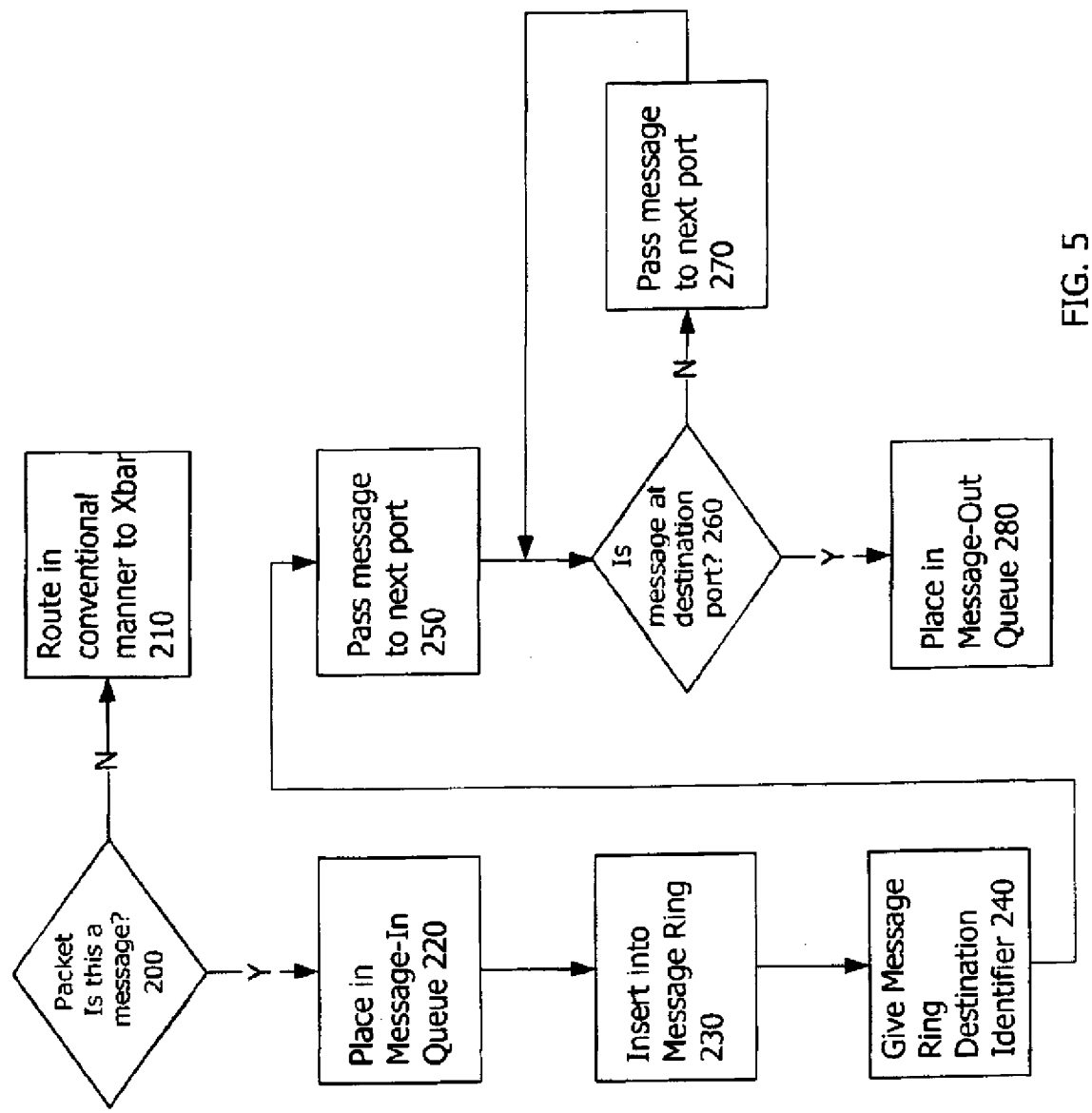

FIG. 5 is a flow chart illustrating the operation of FIGS. 3, 4 and 5. In step 200 a data packet is analyzed by the parser 22 and it is determined whether it is a message or frame.

Then in step 210, if it is a frame, it is routed in the conventional manner through the crossbar switch as discussed above. If a message is placed in a message-in queue in step 220 (as also illustrated in FIG. 3) it is handled in a first in, first out (FIFO) manner.

In step 230 the message is inserted into one of the ports or nodes of the message ring, that is 500a-500h, and is also given a message ring destination identifier in step 240. It is passed from port to port in step 250 under the control of the clock 560 and the gate unit of FIG. 4.

In step 260 the question is asked if the message is at its destination port. If no, it is passed to the next port in step 270 but if yes as indicated in FIG. 5, it is placed in a message out queue in step 280. And as illustrated in FIG. 3, the message out queue is a message FIFO which is operating in an output manner.

Thus, messages do not pass through the crossbar 510 as illustrated in FIG. 3 but instead they are passed directly through the message ring from port to port. Thus, congestion of the crossbar switch is minimized.

In summary, a switching network for receiving and transmitting data packets having both frames and messages is provided by the use of a message ring.

Closing Comments

The foregoing is merely illustrative and not limiting, having been presented by way of example only. Although exemplary embodiments of the invention have been shown and described, it will be apparent to those having ordinary skill in the art that changes, modifications, and/or alterations may be made, none of which depart from the spirit of the present invention. All such changes, modifications and alterations should therefore be seen as within the scope of the present invention.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A switching network for receiving and transmitting data packets having both frames which consist of relatively long strings of bytes and messages which consist of small entities of bytes comprising:
    a plurality of data ports, wherein:
        each of the plurality of data ports can be an input port for sending the frames and the messages, and
        each of the plurality of data ports can be an output port for receiving the frames and the messages;
    a message ring comprising one or more components successively interconnecting one data port to an adjacent data port for passing the messages from an input port, successively through a plurality of intermediate ports to a destination output port; and
    a crossbar for connecting the plurality of data ports for switching the frames from an input port to an output port;
    wherein the frames and messages are processed concurrently,
    wherein the messages do not pass through the crossbar.

2. The switching network as in claim 1 further comprising a parser configured to separate the frames from the messages to form two separate data streams.

3. The switching network as in claim 2 wherein the parser further comprises a frame queue and a message queue.

4. The switching network as in claim 3 wherein the messages are given a message ring destination identifier.

5. The switching network of claim 1 wherein the message ring further comprises a clock configured to move the messages from one data port to another data port for every clock pulse.

6. The switching network of claim 1 wherein the message ring further comprises a ring controller.

7. The switching network of claim 6 further comprising a gate associated with each of the plurality of data ports configured to allow a message into a data port only if no other data is present in said data port.

8. The switching network of claim 7 wherein the ring controller manages the gate.

9. The switching network of claim 1 wherein the frames comprise 40 to 64 bytes.

10. The switching network of claim 1 wherein the messages comprise 4, 8, or 12 bytes.

11. A switching network for receiving and transmitting data packets having both frames which consist of relatively long strings of bytes and messages which consist of small entities of bytes, comprising:
   a plurality of switch elements, where each switch element comprises:
      a plurality of data ports, wherein:
         each of the plurality of data ports can be an input port for sending the frames and the messages, and
         each of the plurality of data ports can be an output port for receiving the frames and the messages;
      a message ring comprising one or more components successively interconnecting one data port to an adjacent data port for passing the messages from an input port, successively through a plurality of intermediate ports to a destination output port; and
      a crossbar for connecting the plurality of data ports for switching the frames from an input port to an output port,
   wherein the frames and messages are processed concurrently,
   wherein the messages do not pass through the crossbar.

12. The switching network as in claim 11 wherein each switch element further comprises a parser configured to separate the frames from the messages to form two separate data streams.

13. The switching network as in claim 12 wherein the parser further comprises a frame queue and a message queue.

14. The switching network as in claim 13 wherein the messages are given a message ring destination identifier.

15. The switching network of claim 11 wherein the message ring further comprises a clock configured to move the messages from one data port to another data port for every clock pulse.

16. The switching network of claim 11 wherein the message ring further comprises a ring controller.

17. The switching network of claim 16 wherein each switch element further comprises a gate associated with each of the plurality of data ports for allowing a message into a data port only if no other data is present in said data port.

18. The switching network of claim 17 wherein the ring controller manages the gate.

19. The switching network of claim 11 wherein the frames comprise 40 to 64 bytes.

20. The switching network of claim 11 wherein the messages comprise 4, 8, or 12 bytes.

21. A switching network for processing data, comprising:
   a crossbar switch configured to process frames;
   a message ring comprising a controller and a plurality of data ports which are interconnected with each other, the message ring configured to process messages; and
   a parser configured to forward the messages to the message ring and to forward the frames to the crossbar, wherein the messages are not forwarded to the crossbar switch.

22. The switching network of claim 21, wherein the frames and messages are processed concurrently.

23. The switching network of claim 21 wherein the parser is configured to identify which portion of the data is a frame or a message.

24. The switching network of claim 23 wherein the parser is configured to separate the identified frames or the identified messages from the data.

25. The switching network as in claim 24 wherein the parser comprises a frame queue and a message queue and is configured to insert the frame to a frame queue and the message to the message queue.

26. The switching network as in claim 23 wherein the messages are given a message ring destination identifier.

27. The switching network of claim 21, wherein the message ring further comprises a clock employed to move the messages from one data port to another data port at a specified clock frequency.

28. A method performed by a data switching apparatus, comprising:
   receiving a data packet;
   determining whether the data packet is a message or a frame;
   if the data packet is a frame, causing a crossbar switch to handle the frame; and
   if the data packet is a message, causing the message to traverse one or more ports coupled to a message ring and not the crossbar switch.

29. The method of claim 28 further comprising placing the message in a message-in queue if the data packet is a message.

30. The method of claim 28 further comprising placing the message in a message-out queue after the message reaches a destination port.

31. A system, comprising:
   means for receiving a data packet; and
   means for determining whether the data packet is a message or a frame; causing a crossbar switch to handle the frame if the data packet is a frame; and causing the message to traverse one or more ports coupled to a message ring and not the crossbar switch if the data packet is a message.

32. The system of claim 31 further comprising means for placing the message in a message-in queue if the data packet is a message.

33. The system of claim 31 further comprising means for placing the message in a message-out queue after the message reaches a destination port.

34. A processor-readable memory storing instructions, when executed cause a data switching apparatus to take an action, the instructions comprising:
   instructions for receiving a data packet;
   instructions for determining whether the data packet is a message or a frame; if the data packet is a frame, causing a crossbar switch to handle the frame; and if the data packet is a message, causing the message to traverse one or more ports coupled to a message ring and not the crossbar switch.

35. The processor-readable memory of claim 34 further comprising instructions for placing the message in a message-in queue if the data packet is a message.

36. The processor-readable memory of claim 34 further comprising instructions for placing the message in a message-out queue after the message reaches a destination port.

* * * * *

UNITED STATES PATENT AND TRADEMARK OFFICE
CERTIFICATE OF CORRECTION

PATENT NO. : 8,619,802 B2  
APPLICATION NO. : 12/831171  
DATED : December 31, 2013  
INVENTOR(S) : Clem et al.

Page 1 of 2

It is certified that error appears in the above-identified patent and that said Letters Patent is hereby corrected as shown below:

In the Drawings

In Fig. 5, Sheet 5 of 5, in Decision Box "260", delete " 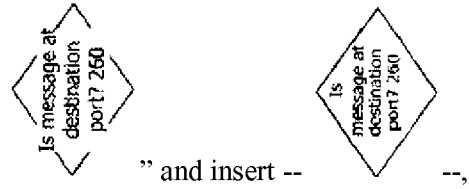 " and insert -- --, therefor, as shown on the attached page 2, sheet 5 of 5.

In Fig. 5, Sheet 5 of 5, in Decision Box "200", delete " 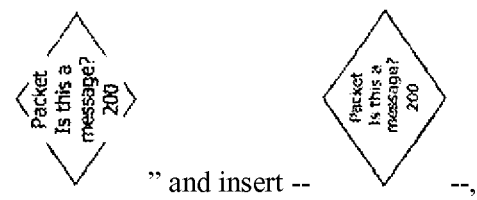 " and insert -- --, therefor, as shown on the attached page 2, sheet 5 of 5.

Signed and Sealed this  
Third Day of June, 2014

Michelle K. Lee  
*Deputy Director of the United States Patent and Trademark Office*